(12) United States Patent
Kleinguetl et al.

(10) Patent No.: US 11,358,183 B2
(45) Date of Patent: Jun. 14, 2022

(54) CAPTURE AND RECYCLING METHODS FOR NON-AQUEOUS CLEANING MATERIALS

(71) Applicant: Halliburton Energy Services, Inc., Houston, TX (US)

(72) Inventors: Kevin G. Kleinguetl, Kingwood, TX (US); Brice A. Jackson, Houston, TX (US); Lawrence J. Herskowitz, Pearland, TX (US); Adam Dotson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 541 days.

(21) Appl. No.: 16/339,336

(22) PCT Filed: Dec. 20, 2017

(86) PCT No.: PCT/US2017/067676
§ 371 (c)(1),
(2) Date: Apr. 3, 2019

(87) PCT Pub. No.: WO2019/125443
PCT Pub. Date: Jun. 27, 2019

(65) Prior Publication Data
US 2021/0339293 A1 Nov. 4, 2021

(51) Int. Cl.
*B08B 5/02* (2006.01)
*B01D 46/54* (2006.01)
(Continued)

(52) U.S. Cl.
CPC .............. *B08B 5/02* (2013.01); *B01D 46/543* (2013.01); *B01D 53/228* (2013.01);
(Continued)

(58) Field of Classification Search
CPC ......... B08B 5/02; B08B 9/0328; B08B 9/093; B08B 13/00; B08B 2209/032;
(Continued)

(56) References Cited

U.S. PATENT DOCUMENTS

| 4,617,064 A | 10/1986 | Moore |
| 4,744,181 A | 5/1988 | Moore et al. |

(Continued)

FOREIGN PATENT DOCUMENTS

| CN | 105632574 A | * 6/2016 |
| EP | 0909352 B1 | 9/2003 |

(Continued)

OTHER PUBLICATIONS

International Search Report and Written Opinion dated Sep. 19, 2018 in International Applicaton No. PCT/US2017/067676.

*Primary Examiner* — Sharidan Carrillo
(74) *Attorney, Agent, or Firm* — McGuireWoods LLP

(57) ABSTRACT

Included are methods and systems for recycling a gas emitted from non-aqueous cleaning. An example method includes contacting a contaminated equipment with a non-aqueous cleaning material; wherein the spent non-aqueous cleaning material emits the gas. The method further comprises capturing the emitted gas, filtering the emitted gas, and recycling the emitted gas into the non-aqueous cleaning material.

15 Claims, 3 Drawing Sheets

(51) Int. Cl.
  *B01D 53/22* (2006.01)
  *B01D 53/26* (2006.01)
  *B01D 61/00* (2006.01)
  *B01D 61/02* (2006.01)
  *B08B 9/032* (2006.01)
  *B08B 9/093* (2006.01)
  *B08B 13/00* (2006.01)
  *B24C 9/00* (2006.01)
  *E21B 41/00* (2006.01)

(52) U.S. Cl.
  CPC ......... *B01D 53/268* (2013.01); *B01D 61/002* (2013.01); *B01D 61/025* (2013.01); *B08B 9/0328* (2013.01); *B08B 9/093* (2013.01); *B08B 13/00* (2013.01); *B24C 9/006* (2013.01); *E21B 41/00* (2013.01); *B01D 2053/221* (2013.01); *B08B 2209/032* (2013.01); *B08B 2209/08* (2013.01)

(58) Field of Classification Search
  CPC .............. B08B 2209/08; B01D 46/543; B01D 53/228; B01D 53/268; B01D 2053/221; B24C 9/006; E21B 41/00
  See application file for complete search history.

(56) References Cited

U.S. PATENT DOCUMENTS

| | | | |
|---|---|---|---|
| 4,924,643 A | 5/1990 | Buiguez et al. | |
| 7,128,169 B2 | 10/2006 | Massetti et al. | |
| 8,002,038 B2* | 8/2011 | Wilson | E21B 43/267 166/402 |
| 2003/0221704 A1* | 12/2003 | Johnson | C01B 32/50 134/2 |
| 2003/0226576 A1* | 12/2003 | Gray | B08B 3/12 134/1 |
| 2004/0035146 A1 | 2/2004 | Dannings | |
| 2004/0256104 A1* | 12/2004 | Wilson | E21B 36/001 166/305.1 |
| 2007/0044960 A1* | 3/2007 | Lovell | E21B 43/122 166/250.07 |
| 2012/0094581 A1 | 4/2012 | Sharma | |
| 2012/0145402 A1* | 6/2012 | Hilliard | E21B 37/00 166/312 |
| 2013/0087047 A1* | 4/2013 | Yi | B01D 53/10 96/144 |
| 2014/0075984 A1* | 3/2014 | Sugawara | B01D 53/0438 62/606 |
| 2014/0124001 A1 | 5/2014 | White | |
| 2016/0184967 A1* | 6/2016 | Ujiie | B24C 5/04 451/39 |
| 2016/0214149 A1* | 7/2016 | Chiang | B24C 1/003 |

FOREIGN PATENT DOCUMENTS

| | | |
|---|---|---|
| EP | 1459812 A1 | 9/2004 |
| EP | 1824614 A1 | 8/2007 |
| EP | 2208578 A1 | 7/2010 |
| EP | 2486224 A2 | 8/2012 |
| EP | 2512737 A1 | 10/2012 |
| EP | 2548842 A1 | 1/2013 |
| EP | 1843874 B1 | 2/2013 |
| EP | 2926951 A1 | 10/2015 |
| JP | 5702331 B2 | 4/2015 |
| WO | 2008087544 A1 | 7/2008 |
| WO | 2008144405 A1 | 11/2008 |

* cited by examiner

CAPTURE AND RECYCLING METHODS FOR NON-AQUEOUS CLEANING MATERIALS

TECHNICAL FIELD

The present disclosure relates to capturing gas emitted from non-aqueous cleaning materials and recycling the gas into non-aqueous cleaning materials, and more particularly, to the capturing and recycling of carbon dioxide or nitrogen gas emitted from the non-aqueous cleaning of wellbore equipment.

BACKGROUND

Wellbore equipment such as fluid vessels, conduits, solids control equipment, drilling equipment, and the like may need to be cleaned after use to remove oil and solid contaminants. Cleaning wellbore equipment with water may result in the production of wastewater containing oil contaminants and other regulated hazardous substances. In order to comply with the disposal regulations, expensive filtration or storage operations may need to be performed in order to dispose of the wastewater. As such, the ability to clean wellbore equipment using water-based cleaning methods may result in increased operational overhead.

Cleaning methods that do not utilize water may also be subject to environmental regulations that may limit their use or reduce their effectiveness. Further, the need to purchase or prepare new cleaning materials for every cleaning operation may result in increased operational expenses.

BRIEF DESCRIPTION OF THE DRAWINGS

Illustrative examples of the present disclosure are described in detail below with reference to the attached drawing figures, which are incorporated by reference herein, and wherein.

Figure 1:
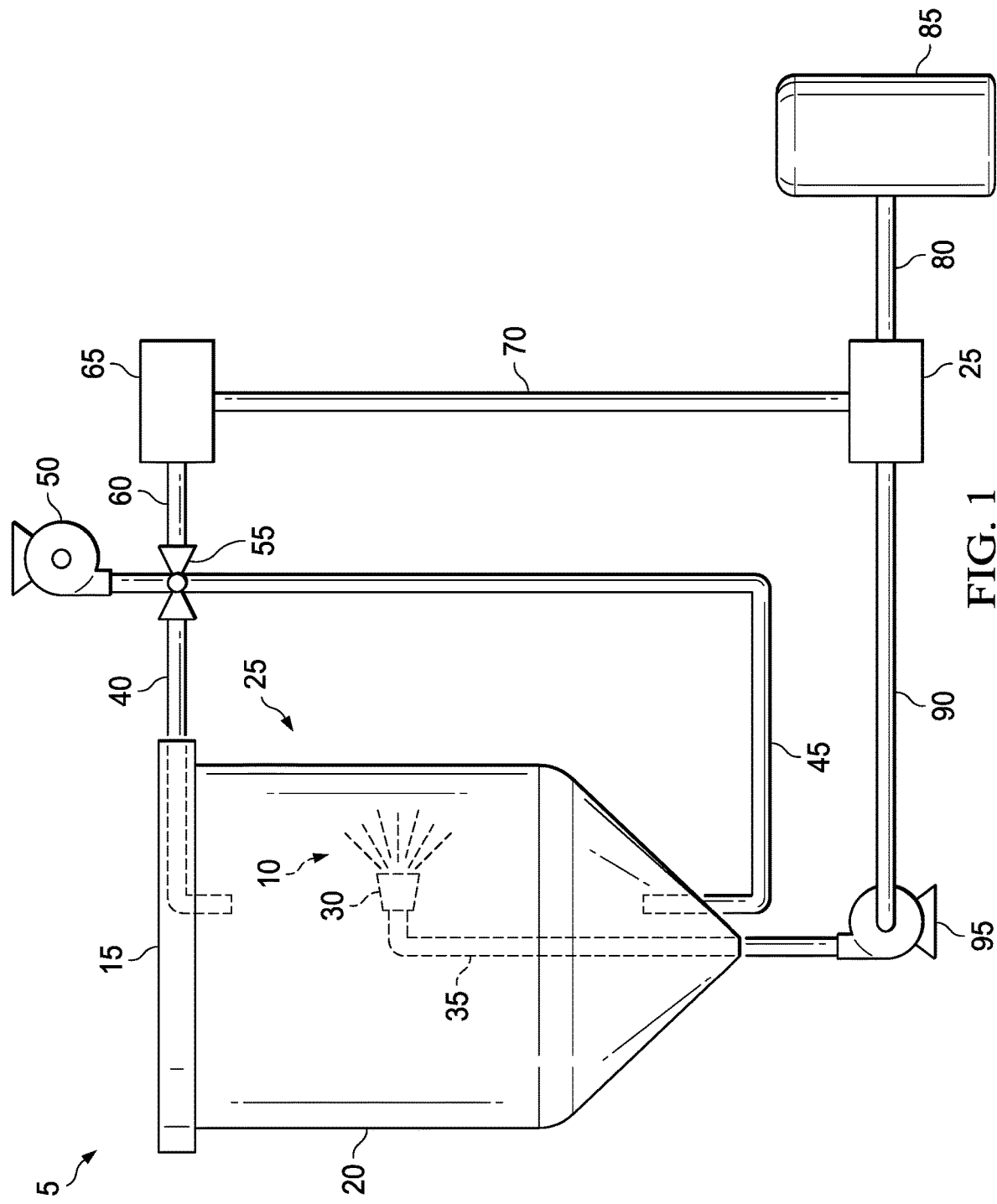
FIG. 1 is a schematic illustrating a system for capturing and recycling a gas emitted from spent non-aqueous cleaning materials in accordance with the examples disclosed herein.

The illustrated figures are only exemplary and are not intended to assert or imply any limitation with regard to the environment, architecture, design, or process in which different examples may be implemented.

DETAILED DESCRIPTION

The present disclosure relates to capturing gas emitted from non-aqueous cleaning materials and recycling the gas into non-aqueous cleaning materials, and more particularly, to the capturing and recycling of carbon dioxide or nitrogen gas emitted from the non-aqueous cleaning of wellbore equipment.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods and systems described herein relate to the capturing and recycling of gas emitted from non-aqueous cleaning methods. As used herein, the qualifier "non-aqueous" refers to a material that does not substantially contain an aqueous fluid such as liquid water or water vapor. One of the many potential advantages to the disclosed methods is that the disclosed non-aqueous cleaning materials emit a gas when spent, and this emitted gas may be captured and recycled to resupply the non-aqueous cleaning materials for subsequent use. Another potential advantage is that the non-aqueous cleaning materials do not produce wastewater or other such contaminated fluid that may incur expensive disposal costs. Yet a further advantage is that the non-aqueous cleaning materials do not leave behind a residue, resulting in the cleaned equipment being available for use faster and without the need for drying equipment. Yet another potential advantage is that the disclosed systems are enclosed and therefore do not emit a gas into the atmosphere, and therefore may be used in jurisdictions in which said emissions are regulated or restricted. One more additional advantage is that the systems are adjustable to be continuous or automated if desired, eliminating the need for operators to perform the cleaning methods.

The examples described herein comprise the use of non-aqueous cleaning materials. The non-aqueous cleaning materials comprise different phases of carbon dioxide and/or nitrogen. General examples of the non-aqueous cleaning materials include, but are not limited to, solid carbon dioxide, liquid carbon dioxide, gaseous carbon dioxide, solid nitrogen, liquid nitrogen, gaseous nitrogen, or a mixture thereof. A specific example of the non-aqueous cleaning materials are pelletized solid particulates. The pelletized solid particulates are formed into pellets that are sized to a desired size. The pelletized solid particulates may be sprayed onto a surface of contaminated equipment at a sufficient velocity to mechanically dislodge contaminant particles from the contaminated equipment. As the pellets sublimate, they expand in volume and remove surrounding contaminants. These pellets may be of any desired size, with the larger pellets being used for more durable materials that are able to withstand the impacts of the pellets. Another specific example is a compressed liquid and/or gaseous non-aqueous cleaning material. The compressed liquid and/or gaseous non-aqueous cleaning material may be compressed and expelled at high pressure through a nozzle or other discharging conduit, where it can condense to provide a mixture of solid particles and gas which may then impact the surface of the contaminated equipment at a sufficient velocity to mechanically dislodge contaminant particles via high velocity collisions combined with thermal shock.

Another specific example comprises the use of a liquid non-aqueous cleaning material sprayed at low temperatures and pressures to solvate contaminants. The liquid non-aqueous cleaning material may dislodge and dissolve some contaminants allowing for easier removal by physically wiping or spraying the contaminants away from the surface of the contaminated equipment. Surfactants and agitation may be added to any of the described examples of the non-aqueous cleaning materials if desired. When exposed to ambient temperature and pressure, the non-aqueous cleaning materials may undergo a phase transition (if not already gaseous) to become gaseous. As such, the non-aqueous cleaning materials vaporize or sublimate to emit a gas when spent. This emitted gas may then be captured as described herein. In some examples, the non-aqueous cleaning materials may be obtained from the environment, or from artificial sources such as exhaust gases, including exhaust gases from on-site internal combustion engines. Alternatively, the non-aqueous cleaning materials may be purchased and prepared for use. Additionally, gases used for other operations such as onsite carbon dioxide or nitrogen well injection applications, may be repurposed and used for the applications described herein.

FIG. 1 is a schematic illustrating a system 5 for capturing and recycling a gas emitted from spent non-aqueous cleaning materials 10. System 5 comprises a lid 15 disposed on a contaminated vessel 20. Lid 15 is shaped such that it seals contaminated vessel 20 and does not allow leakage of non-aqueous cleaning materials 10 or the emitted gas from contaminated vessel 20. Lid 15 and contaminated vessel 20 together comprise a sealed vessel 25 used to contain the non-aqueous cleaning materials 10 and the emitted gas produced from the spent non-aqueous cleaning materials 10, thereby preventing leakage of the emitted gas into the surrounding atmosphere. Contaminated vessel 20 may be any vessel that may be cleaned by the non-aqueous cleaning materials 10 disclosed herein. Examples of contaminated vessel 20 may include, but are not limited to, drilling fluid tanks, storage tanks, mixing tanks, conduits, tubulars, or any container or tubing that may be used to store wellbore fluids, treatment fluids, and the like. Preferred examples of some contaminated vessels are those that have contacted hydrocarbon fluids, as the hydrocarbons may be solvated by the non-aqueous cleaning materials 10 in some examples.

With continued reference to FIG. 1, nozzle 30 may be attached to a discharge conduit 35. The discharge conduit 35 may convey the non-aqueous cleaning materials 10 to the nozzle 30. The nozzle 30 may be sized such to spray the non-aqueous cleaning materials 10 at a desired angle, velocity, and/or pressure. In some examples, the nozzle 30 may comprise an array of nozzles. In examples utilizing solid non-aqueous cleaning materials 10, the nozzle 30 may comprise apertures that are sized such to allow passage of a desired particulate size of the solid non-aqueous cleaning materials 10. The nozzle 30 may also comprise apertures sized such to condense and compress the liquid/gas forms of non-aqueous cleaning materials 10 to induce formation of solid particulates of the non-aqueous cleaning materials 10 dispersed in the liquid/gas. In some examples, the nozzle 30 may not be included in system 5. For example, if pelletized solid particulates of the non-aqueous cleaning materials 10 are chosen, the particulates may be discharged from the end of the discharge conduit 35 without passage through a nozzle 30.

Referring still to FIG. 1, an upper vacuum conduit 40 and lower vacuum conduit 45 may be disposed such that they exit into the interior of the sealed vessel 25. The use of the terms "upper" and "lower" are not intended to describe any specific location of the upper vacuum conduit 40 and lower vacuum conduit 45 within the sealed vessel 25, but are merely used to describe the orientation of the upper vacuum conduit 40 and lower vacuum conduit 45 relative to each other in the sealed vessel 25. Upper vacuum conduit 40 and lower vacuum conduit 45 are in selective fluid communication with vacuum pump 50 via valve 55. Vacuum pump 50 applies suction resulting in a negative pressure in the sealed vessel 25 via one of the upper vacuum conduit 40 or lower vacuum conduit 45. The vacuum pump 50 may be used to maintain the negative pressure in the sealed vessel 25 while the discharge of the non-aqueous cleaning materials 10 is occurring. In some examples, outside air comprising a higher pressure that the internal pressure of the sealed vessel 25 may be allowed into the sealed vessel 25 via the other of the upper vacuum conduit 40 or lower vacuum conduit 45 not used to apply suction to the sealed vessel 25. As this outside air is at a higher pressure than the negative pressure maintained within the sealed vessel 25, leakage of the non-aqueous cleaning materials 10 or the emitted gas provided therefrom does not occur, and the sealed vessel 25 remains sealed for the emitted gas allowing for its capture.

As noted above, the upper vacuum conduit 40 and lower vacuum conduit 45 are positioned in upper and lower orientations relative to each other. Suction is selectively applied to either one of the upper vacuum conduit 40 and lower vacuum conduit 45 via vacuum pump 50 and valve 55 so as to capture the emitted gas dependent upon whether the emitted gas is heavier or lighter than the air within the sealed vessel 25. If the emitted gas is heavier than the air within the sealed vessel 25, it will sink and may be captured by lower vacuum conduit 45. If the emitted gas is lighter than the air within the sealed vessel 25, it will rise and may be captured by upper vacuum conduit 40.

With continued reference to FIG. 1, the emitted gas captured by either one of the upper vacuum conduit 40 or lower vacuum conduit 45 may be conveyed via filtration system conduit 60 to a filtration system 65. Filtration system 65 may remove any contaminants from the emitted gas that were carried with the emitted gas into the upper vacuum conduit 40 or lower vacuum conduit 45. Filtration system 65 comprises any filtration component (e.g., a filter, membrane, etc.) that may be used for filtering contaminants from the emitted gas. The filtration system 65 may also be used to separate pure gases required for re-use and/or storage (e.g., carbon dioxide and nitrogen) from unwanted gases like air and water vapor. Examples of the filtering process that may be performed by filtration system 65 include, but are not limited to, osmotic filtering, reverse osmotic filtering, or a combination thereof. In some examples, filtration system 65 may comprise a pump to pump the emitted gas through the filtration system 65. A pump may also be used to pump the cleaned emitted gas out of the filtration system 65.

After the emitted gas has been cleaned by the filtration system, the cleaned emitted gas may be conveyed via the freezing system conduit 70 to a freezing system 75. Freezing system 75 may be used to condense the cleaned emitted gas into a solid and/or liquid. Freezing system 75 may adjust the pressure and/or the temperature of the emitted gas to phase transition the emitted gas into a solid or liquid by pressurizing and refrigerating the emitted gas as would be apparent to one of ordinary skill in the art. In some examples, other processes such as cryogenic distillation may be performed, in particular, if the emitted gas has mixed with a sufficient quantity of surrounding air within the sealed vessel 25 and the air was not completely removed by the filtration system 65. As such, freezing system 75 may be used to condition the cleaned emitted gas such that it is recycled into the non-aqueous cleaning materials 10. Optionally, a pump may be used to pump the recycled non-aqueous cleaning materials 10 out of the freezing system 75.

Referring still to FIG. 1, if the recycled non-aqueous cleaning materials 10 are not to be reused in the cleaning of the contaminated vessel 20 (e.g., if the contaminated vessel 20 cleaning has completed), the recycled non-aqueous cleaning materials 10 may be conveyed via storage conduit 80 to a storage container 85. Storage container 85 may be any container sufficient for storing the non-aqueous cleaning materials 10 at the necessary temperature and pressure to maintain the non-aqueous cleaning materials 10 in the desired phase. In some examples, storage container 85 may be removed from system 5 and stored independently of system 5 for later use.

If the recycled non-aqueous cleaning materials 10 are to be reused in the cleaning of the contaminated vessel 20, the recycled non-aqueous cleaning materials 10 may be conveyed via pressurizing conduit 90 to a high-pressure pump 95. The high-pressure pump 95 may then pressurize the recycled non-aqueous cleaning materials 10 to a desired pressure and release the recycled non-aqueous cleaning materials 10 to the discharge conduit 35 to be used for cleaning the contaminated vessel 20. As such, the cleaning of the contaminated vessel 20 may be a continuous process with the continued capture and recapture of the emitted gas from the non-aqueous cleaning materials 10 and the cleaning and conditioning of the emitted gas to recycle the non-aqueous cleaning materials 10 for continued use. Further, as the contaminated vessel 20 is sealed, leakage of the non-aqueous cleaning materials 10 does not occur, and efficient use of the filtration system 65 and freezing system 75 may ensure a sufficient supply of non-aqueous cleaning materials 10 for continuous cleaning or storage for later use.

In some examples, the system 5 may be automated, for example, by using an articulated arm for the nozzle 30 and/or sweeping nozzle arrays. The automated system 5 may also comprise sensors, for example, disposed on lid 15 to measure process efficiency and to adjust cleaning cycle times as desired. These sensors may be used to measure tank cleanliness in order to assess operation completion. Examples of sensors may include, but are not limited to, acoustic, ultrasonic, capacitance, resistivity, mechanical measurement of the tank surface friction, or any combination thereof.

Figure 2:
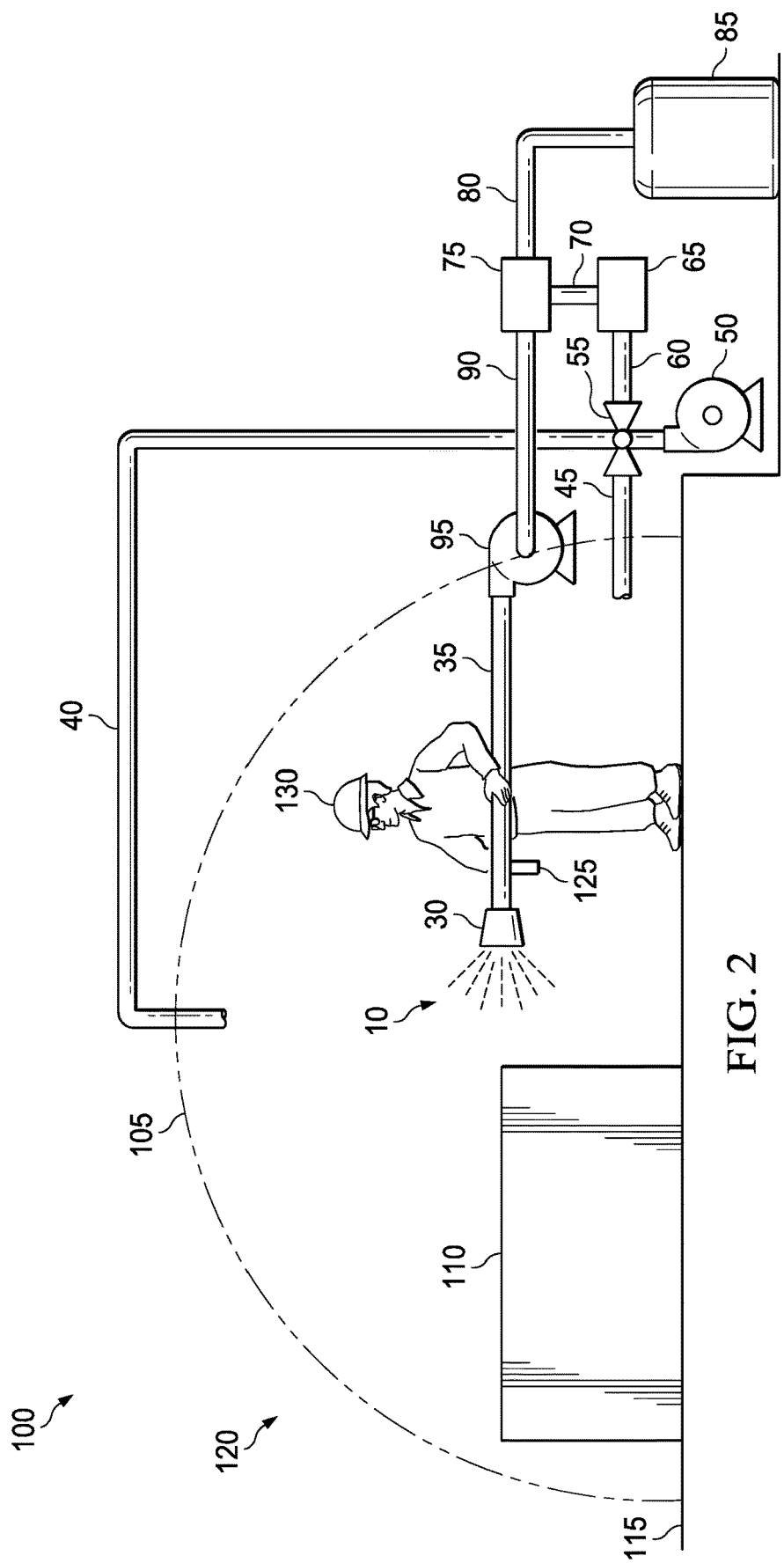
FIG. 2 is a schematic illustrating another system for capturing and recycling a gas emitted from spent non-aqueous cleaning materials in accordance with the examples disclosed herein.

FIG. 2 is a schematic illustrating a system 100 for capturing and recycling a gas emitted from spent non-aqueous cleaning materials 10. System 100 comprises a dome 105 disposed around a contaminated equipment 110. Dome 105 is shaped such that it completely covers contaminated equipment 110. Dome 105 and surface 115 produce a sealed vessel 120 used to contain the non-aqueous cleaning materials 10 and the emitted gas produced therefrom, thereby preventing leakage of the emitted gas into the surrounding atmosphere. As discussed below, the use a vacuum pump 50 to maintain the negative pressure in the sealed vessel 120 prevents leakage of the non-aqueous cleaning materials 10 or the emitted gas from occurring, and the sealed vessel 120 remains sealed for the emitted gas allowing for its capture. The contaminated equipment 110 may be any wellbore equipment that may be cleaned by the non-aqueous cleaning materials 10 disclosed herein. Examples of contaminated equipment 110 may include, but are not limited to, drilling fluid tanks, storage tanks, mixing tanks, solids control equipment, shakers, centrifuges, conduits, tubulars, or any container or tubing that may be used to store wellbore fluids, treatment fluids, and the like. Preferred examples of some contaminated equipment 110 are those that have contacted hydrocarbon fluids, as the hydrocarbons may be solvated by the non-aqueous cleaning materials 10 in some examples.

With continued reference to FIG. 2, the nozzle 30 may be in fluid communication with a discharge conduit 35 via a lance 125 or other type of equipable component that may be used by an operator 130 to discharge the non-aqueous cleaning materials 10 on the contaminated equipment 110. The lance 125 may also be described as a gun, sprayer, wand, or other such device that may be held and used by the operator 130. Analogous to FIG. 1 described above, discharge conduit 35 may convey the non-aqueous cleaning materials 10 to the nozzle 30. The nozzle 30 may be sized such to spray the non-aqueous cleaning materials 10 at a desired angle, velocity, and/or pressure. In examples utilizing solid non-aqueous cleaning materials 10, the nozzle 30 may comprise apertures that are sized such to allow passage of a desired particulate size of the solid non-aqueous cleaning materials 10. The nozzle 30 may also comprise apertures sized such to condense and compress the liquid/gas forms of the non-aqueous cleaning materials 10 to induce formation of solid particulates of the non-aqueous cleaning materials 10. In some examples, the nozzle 30 may not be included in the system 100. For example, if pelletized solid particulates of the non-aqueous cleaning materials 10 are chosen, the particulates may be discharged from the end of the discharge conduit 35 without passage through a nozzle 30.

Referring still to FIG. 2, the upper vacuum conduit 40 and lower vacuum conduit 45 function analogously as described in FIG. 1. The upper vacuum conduit 40 and lower vacuum conduit 45 are in selective fluid communication with the vacuum pump 50 via valve 55. The vacuum pump 50 applies suction resulting in a negative pressure in the sealed vessel 120 via one of the upper vacuum conduit 40 or lower vacuum conduit 45. The vacuum pump 50 may be used to maintain the negative pressure in the sealed vessel 25 while the discharge of the non-aqueous cleaning materials 10 is occurring. In some examples, outside air comprising a higher pressure that the internal pressure of the sealed vessel 25 may be allowed into the sealed vessel 120 via the other of the upper vacuum conduit 40 or lower vacuum conduit 45 not used to apply suction to the sealed vessel 25. Alternatively, or in addition to, the outside air may enter through gaps between dome 105 and surface 115. As this outside air is at a higher pressure than the negative pressure maintained within the sealed vessel 120, leakage of the non-aqueous cleaning materials 10 and/or the emitted gas provided therefrom does not occur, and the sealed vessel 120 remains sealed for the emitted gas allowing for its capture.

With continued reference to FIG. 2, the emitted gas captured by either one of the upper vacuum conduit 40 or lower vacuum conduit 45 may be conveyed via filtration system conduit 60 to a filtration system 65. Filtration system 65 functions analogously as described in FIG. 1. Filtration system 65 may remove contaminants from the emitted gas that were carried with the emitted gas into the upper vacuum conduit 40 or lower vacuum conduit 45. In some examples, a pump may be used to pump the cleaned emitted gas out of the filtration system 65.

After the emitted gas has been cleaned by the filtration system, the cleaned emitted gas may be conveyed via the freezing system conduit 70 to a freezing system 75. Freezing system 75 functions analogously as described in FIG. 1. Freezing system 75 may be used to condense the cleaned emitted gas into a solid and/or liquid. As such, freezing system 75 may be used to condition the cleaned emitted gas such that it is recycled into the non-aqueous cleaning materials 10. Optionally, a pump may be used to pump the recycled non-aqueous cleaning materials 10 out of the freezing system 75.

Referring still to FIG. 2, if the recycled non-aqueous cleaning materials 10 are not to be reused in the cleaning of the contaminated equipment 110 (e.g., if the contaminated equipment 110 cleaning has completed), the recycled non-aqueous cleaning materials 10 may be conveyed via storage conduit 80 to a storage container 85. The storage container 85 may be any container sufficient for storing the non-aqueous cleaning materials 10 at the necessary temperature and pressure to maintain the non-aqueous cleaning materials 10 in the desired phase. In some examples, the storage container 85 may be removed from the system 100 and stored independently of the system 100 for later use.

If the recycled non-aqueous cleaning materials 10 are to be reused in the cleaning of the contaminated equipment 110, the recycled non-aqueous cleaning materials 10 may be conveyed via pressurizing conduit 90 to a high-pressure pump 95. High-pressure pump 95 functions analogously as described in FIG. 1. The high-pressure pump 95 may pressurize the recycled non-aqueous cleaning materials 10 to a desired pressure and release the recycled non-aqueous cleaning materials 10 to the discharge conduit 35 to be used for cleaning contaminated equipment 110. The high-pressure pump 95 is illustrated as interfacing with the dome 105. However, in some alternative examples, the high-pressure pump 95 may not interface with the dome 105 and may be disposed on either the interior or exterior side of the dome 105, in which case either the pressurizing conduit 90 or the discharge conduit 35 would traverse the dome 105 and be interfaced with the dome 105 such that leakage out of the dome 105 does not occur.

The cleaning of the contaminated equipment 110 may be a continuous process with the continued capture and recapture of the emitted gas from the non-aqueous cleaning materials 10 and the cleaning and conditioning of the emitted gas to recycle the non-aqueous cleaning materials 10 for continued use. Further, as the sealed vessel 120 is sealed such that leakage of the non-aqueous cleaning materials 10 and/or the emitted gas does not occur, the efficient use of the filtration system 65 and the freezing system 75 may ensure a sufficient supply of non-aqueous cleaning materials 10 for continuous cleaning or storage for later use.

In some examples, the system 100 may be automated, for example, by using an articulated arm for the nozzle 30 and/or sweeping nozzle arrays. The automated system 100 may also comprise sensors, for example, disposed on dome 105 to measure process efficiency and to adjust cleaning cycle times as desired. As such, there is no need for an operator 130 inside the dome 105, and the system 100 may proceed without relying on operator 130 to perform the cleaning operation of contaminated equipment 110.

Figure 3:
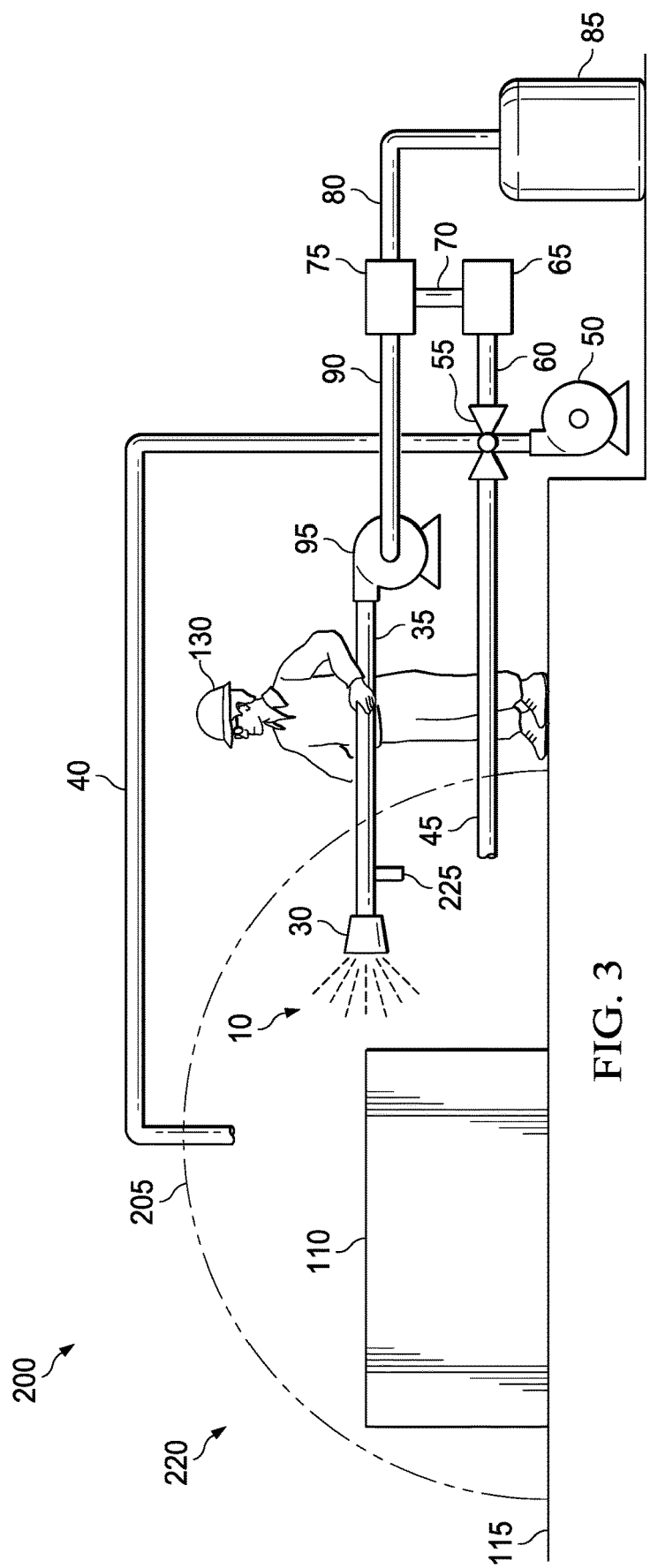
FIG. 3 is a schematic illustrating another system for capturing and recycling a gas emitted from spent non-aqueous cleaning materials in accordance with the examples disclosed herein.

FIG. 3 is a schematic illustrating a system 200 for capturing and recycling a gas emitted from spent non-aqueous cleaning materials 10. The system 200 comprises a dome 205 disposed around a contaminated equipment 110. Dome 205 is shaped such that it completely covers the contaminated equipment 110. The dome 205 and the surface 115 produce a sealed vessel 220 used to contain the non-aqueous cleaning materials 10 and the emitted gas produced therefrom, thereby preventing leakage of the non-aqueous cleaning materials 10 and/or the emitted gas into the surrounding atmosphere. As discussed below, the use of a vacuum pump 50 to maintain the negative pressure in the sealed vessel 220 prevents leakage of the non-aqueous cleaning materials 10 or the emitted gas from occurring, and the sealed vessel 220 remains sealed for the emitted gas allowing for its capture. The contaminated equipment 110 may be any wellbore equipment as described in FIG. 2. The dome 205 functions analogously to the dome 105 illustrated in FIG. 1; however, the dome 205 comprises a smaller shape, and thus sealed vessel 220 comprises a smaller volume than the dome 105.

With continued reference to FIG. 3, the nozzle 30 may be in fluid communication with a discharge conduit 35 via a lance 225 or other type of equipable component that may be used by an operator 130 to discharge the non-aqueous cleaning materials 10 on the contaminated equipment 110. Lance 225 may also be described as a gun, sprayer, wand, or other such device that may be held and used by the operator 130. The lance 225 may differ from the lance 125 illustrated in FIG. 1 in that the lance 225 interfaces with the dome 205 such that the operator 130 may operate the lance 225 outside of the dome 205. Analogous to FIGS. 1 and 2 described above, the discharge conduit 35 may convey the non-aqueous cleaning materials 10 to the nozzle 30. The nozzle 30 may be sized such to spray the non-aqueous cleaning materials 10 at a desired angle, velocity, and/or pressure. In examples utilizing solid non-aqueous cleaning materials 10, the nozzle 30 may comprise apertures that are sized such to allow passage of a desired particulate size of the solid non-aqueous cleaning materials 10. The nozzle 30 may also comprise apertures sized such to condense and compress the liquid/gas forms of the non-aqueous cleaning materials 10 to induce the formation of solid particulates of the non-aqueous cleaning materials 10. In some examples, the nozzle 30 may not be included in the system 200. For example, if pelletized solid particulates of the non-aqueous cleaning materials 10 are chosen, the particulates may be discharged from the end of the discharge conduit 35 without passage through a nozzle 30.

Referring still to FIG. 3, the upper vacuum conduit 40, lower vacuum conduit 45, vacuum pump 50, and valve 55 function analogously as described in FIGS. 1 and 2. The emitted gas captured by either one of the upper vacuum conduit 40 or lower vacuum conduit 45 may be conveyed via filtration system conduit 60 to a filtration system 65. Filtration system 65 functions analogously as described in FIGS. 1 and 2. After the emitted gas has been cleaned by the filtration system 65, the cleaned emitted gas may be conveyed via the freezing system conduit 70 to a freezing system 75. Freezing system 75 functions analogously as described in FIGS. 1 and 2. If the recycled non-aqueous cleaning materials 10 are not to be reused in the cleaning of the contaminated equipment 110 (e.g., if the contaminated equipment 110 cleaning has completed), the recycled non-aqueous cleaning materials 10 may be conveyed via storage conduit 80 to a storage container 85. The storage container 85 may be any container sufficient for storing the non-aqueous cleaning materials 10 at the necessary temperature and pressure to maintain the non-aqueous cleaning materials 10 in the desired phase. In some examples, the storage container 85 may be removed from the system 100 and stored independently of the system 100 for later use.

If the recycled non-aqueous cleaning materials 10 are to be reused in the cleaning of the contaminated equipment 110, the recycled non-aqueous cleaning materials 10 may be conveyed via pressurizing conduit 90 to a high-pressure pump 95. The high-pressure pump 95 functions analogously as described in FIGS. 1 and 2. The high-pressure pump 95 may pressurize the recycled non-aqueous cleaning materials 10 to a desired pressure and release the recycled non-aqueous cleaning materials 10 to the discharge conduit 35 connected to the lance 225 to be used for cleaning the contaminated equipment 110. The high-pressure pump 95 may be disposed on the outside of the dome 205.

The cleaning of the contaminated equipment 110 may be a continuous process with the continued capture and recapture of the emitted gas from the non-aqueous cleaning materials 10 and the cleaning and conditioning of the emitted gas to recycle the non-aqueous cleaning materials 10 for continued use. Further, as the sealed vessel 220 is sealed such that leakage of the non-aqueous cleaning materials 10 does not occur, the efficient use of the filtration system 65 and freezing system 75 may ensure a sufficient supply of non-aqueous cleaning materials 10 for continuous cleaning or storage for later use.

In some examples, the system 200 may be automated, for example, by using an articulated arm for the nozzle 30 and/or the use of one or more sweeping nozzle arrays. The automated system 200 may also comprise sensors, for example, disposed on the dome 205 to measure process efficiency and to adjust cleaning cycle times as desired. As such, there is no need for an operator 130, and the system 200 may proceed without relying on an operator 130 to perform the cleaning operation of contaminated equipment 110.

It should be clearly understood that the examples illustrated by FIGS. 1-3 are merely general applications of the principles of this disclosure in practice, and a wide variety of other examples are possible. Therefore, the scope of this disclosure is not limited in any manner to the details of FIGS. 1-3 as described herein.

It is also to be recognized that the disclosed systems may also directly or indirectly affect the various downhole equipment and tools that may be cleaned by the systems during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1 and 2.

Provided are systems for recycling gas emitted from non-aqueous cleaning in accordance with the disclosure and the Illustrated FIGS. An example system comprises a sealed vessel, a non-aqueous cleaning material configured to emit the gas when spent, a pump configured to pump the non-aqueous cleaning material, a filtration system configured to clean the emitted gas, and a freezing system configured to recycle the cleaned emitted gas into the non-aqueous cleaning material.

Additionally or alternatively, the system may include one or more of the following features individually or in combination. The sealed vessel may comprise a lid. The sealed vessel may comprise a dome. The system may further comprise a nozzle configured to discharge the non-aqueous cleaning material. The non-aqueous cleaning material may be selected from the group consisting of carbon dioxide, nitrogen, and a combination thereof. The non-aqueous cleaning material may comprise pelletized solid particulates. The non-aqueous cleaning material may comprise a mixture of the gas and solid particulates. The sealed vessel may further comprise a negative pressure.

Provided are systems for recycling gas emitted from non-aqueous cleaning in accordance with the disclosure and the illustrated FIGS. An example system comprises a sealed vessel, a non-aqueous cleaning material configured to emit the gas when spent, a pump configured to pump the non-aqueous cleaning material, a filtration system configured to clean the emitted gas, a freezing system configured to recycle the cleaned emitted gas into the non-aqueous cleaning material, a vacuum pump configured to produce a negative pressure in the sealed vessel, and a nozzle coupled to a lance and configured to discharge the non-aqueous cleaning material.

Additionally or alternatively, the system may include one or more of the following features individually or in combination. The lance may be operated by an operator. The operator may operate the lance inside the sealed vessel. The operator may operate the lance outside the sealed vessel. The operation of the lance may be automated. The sealed vessel may comprise a dome and the lance may be interfaced with the dome. The non-aqueous cleaning material may be selected from the group consisting of carbon dioxide, nitrogen, and a combination thereof. The non-aqueous cleaning material may comprise pelletized solid particulates. The non-aqueous cleaning material may comprise a mixture of the gas and solid particulates. The sealed vessel may further comprise a negative pressure.

Provided are methods for recycling a gas produced from non-aqueous cleaning in accordance with the disclosure and the illustrated FIGS. An example method comprises contacting a contaminated equipment with a non-aqueous cleaning material; wherein the spent non-aqueous cleaning material emits the gas. The method further comprises capturing the emitted gas, filtering the emitted gas, and recycling the emitted gas into the non-aqueous cleaning material.

Additionally or alternatively, the method may include one or more of the following features individually or in combination. The method may further comprise contacting the contaminated equipment with the recycled non-aqueous cleaning material. The method may further comprise storing the recycled non-aqueous cleaning material. The non-aqueous cleaning material may be selected from the group consisting of carbon dioxide, nitrogen, and a combination thereof. The non-aqueous cleaning material may comprise a mixture of the gas and solid particulates. The non-aqueous cleaning material may comprise pelletized solid particulates.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for cleaning a wellbore or drilling fluid tank, comprising:
    cleaning a wellbore or drilling fluid tank contaminated with a hydrocarbon by spraying with a compressed liquid carbon dioxide, liquid nitrogen, or a combination thereof through a nozzle; wherein the liquid carbon dioxide, liquid nitrogen, or a combination thereof condenses to produce particles of carbon dioxide, particles of nitrogen, or a combination thereof,
    dislodging the hydrocarbon contamination by blasting the hydrocarbon contamination with the particles of carbon dioxide, particles of nitrogen, or a combination thereof to produce spent particles,
    vaporizing the spent particles to produce an emitted gas,
    capturing the emitted gas,
    filtering the emitted gas, and
    condensing the emitted carbon dioxide gas, emitted nitrogen gas, or a combination thereof to produce a recycled cleaning liquid.

2. The method of claim 1, further comprising contacting the wellbore or drilling fluid tank with the recycled cleaning liquid.

3. The method of claim 1, further comprising storing the recycled cleaning liquid.

4. The method of claim 1, further comprising a pump to pressurize the recycled cleaning liquid.

5. The method of claim 1, further comprising a freezing system to condense the emitted gas into the recycled cleaning liquid.

6. The method of claim 1, wherein the method is performed within a sealed vessel.

7. The method of claim 1, wherein the nozzle is coupled to a lance.

8. The method of claim 6, wherein the sealed vessel comprises a dome.

9. The method of claim 6, wherein the sealed vessel further comprises a negative pressure.

10. The method of claim 7, wherein the lance is operated by an operator.

11. The method of claim 7, wherein the operation of the lance is automated.

12. The method of claim 7, wherein the lance is interfaced with the dome of a sealed vessel and the method is performed within the sealed vessel.

13. The method of claim 9, wherein a vacuum pump produces a negative pressure in the sealed vessel.

14. The method of claim 10, wherein the operator operates the lance inside a sealed vessel.

15. The method of claim 10, wherein the operator operates the lance outside a sealed vessel.

* * * * *